April 24, 1951     E. M. McNATT     2,550,420
DRILLING RATE LOGGER
Filed Dec. 6, 1947     3 Sheets-Sheet 2
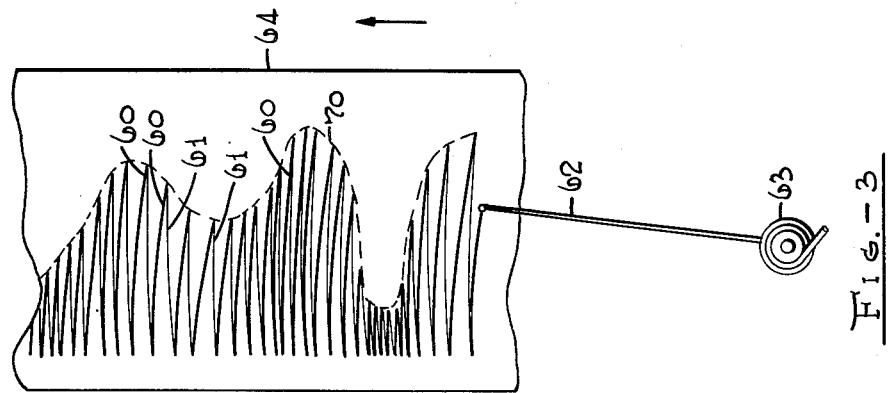
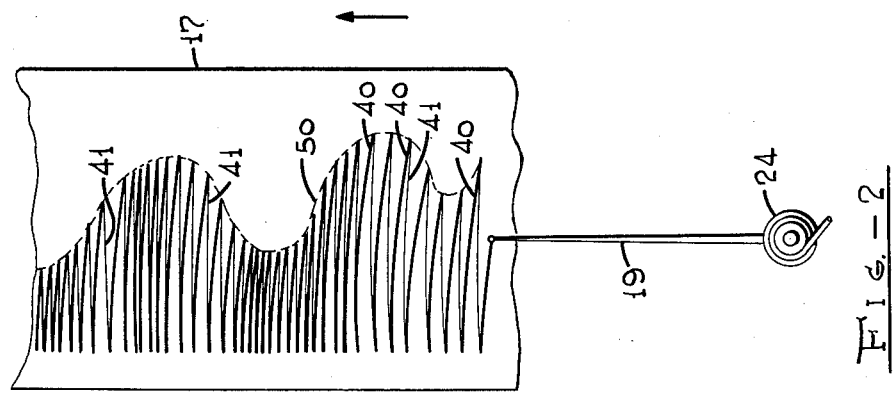
Eugene M. McNatt Inventor
By W. D. T Hilman Attorney Patented Apr. 24, 1951

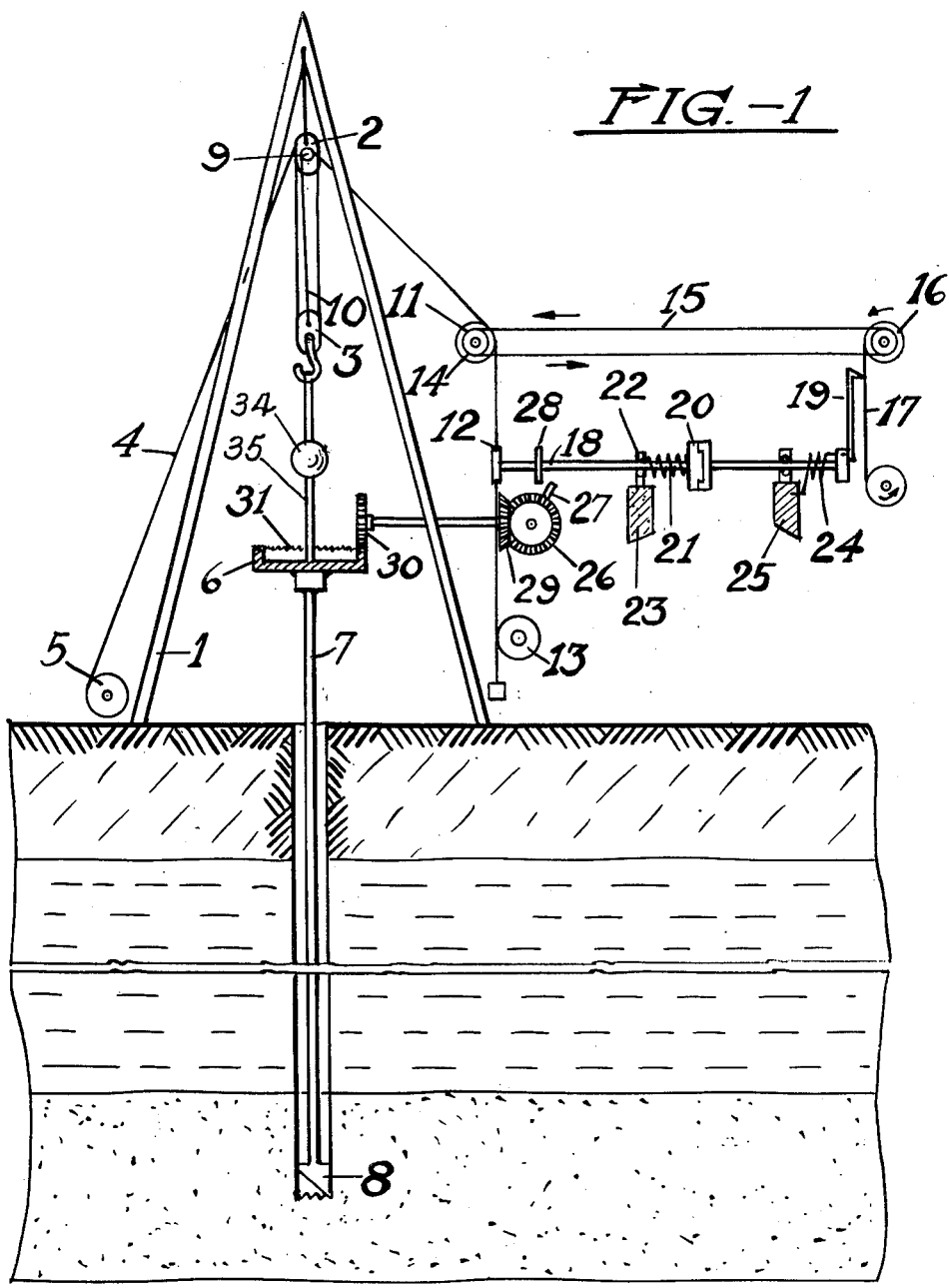

2,550,420

UNITED STATES PATENT OFFICE 2,550,420

DRILLING RATE LOGGER

Eugene M. McNatt, Tulsa, Okla., assignor to Standard Oil Development Company, a corporation of Delaware Application December 6, 1947, Serial No. 790,179

3 Claims. (Cl. 346—39)

This invention relates to an improved method for determining the hardness of sub-surface strata through which drilling operations are carried out. In particular it relates to means for determining and recording the rotation rate of drilling and the time rate of drilling. As used herein, the rotation rate of drilling is defined to be the ratio of the progression of the drill during an arbitrary time interval to the number of revolutions of the drill during the same interval of time. Similarly, the time rate of drilling is defined to be the ratio of the progression of the drill per unit time.

The task of locating oil deposits in the earth is an exceedingly difficult and expensive job. Toward this end, any information which may be gained as to the sub-surface structure is very valuable. A wide variety of means are used to obtain this information. For example, the science of geochemistry relates to the identification of chemical constituents of the earth which may indicate the presence of oil deposits. The science of geophysical exploration relates to the study of the earth in response to a wide variety of physical effects. The present invention is intended to supplement the information obtained from these and other methods by determining the rate at which a drill proceeds in normal drilling operations. As this information may be directly correlated to the hardness of the sub-surface through which a drill progresses, a continuous log of the drilling rate provides desirable information relative to the nature of the sub-surface. It is therefore proposed to plot a record showing the progression of the drill for a predetermined number of revolutions of the drill, whereby the drilling rate may be directly indicated on a record. The information thus made available is useful for indicating sub-strata which may contain oil. This information alone, or as correlated with other data, serves to minimize the possibility of unknowingly progressing through possible oil-bearing strata.

In accordance with the present invention a record paper is moved longitudinally proportional to the downward speed of the drill. A recording pen is moved across the record paper at a rate which is also proportional to the speed of the downward progression of the drill. The pen is caused to return to a null position after a predetermined number of rotations of the drill. The record thus produced shows the penetration of the drill for the predetermined number of revolutions. The envelope of the lines produced on the record thus represents directly, a continuous log of the rotation drilling rate throughout the drilling operation.

To obtain the time rate of drilling in accordance with the present invention a record paper is moved longitudinally at a rate proportional to the downward speed of the drill. A recording pen is moved across the record paper at a rate which is also proportional to the speed of the downward progression of the drill. The pen is caused to return to a null position at arbitrary constant intervals of time. In this way a record is produced which shows the penetration of the drill during each consecutive interval of time. The envelope of the lines produced on the record thus represents directly, a continuous log of the time rate of drilling throughout the drilling operation.

The nature and objects of this invention may be more fully understood from the following description in connection with the accompanying drawings, in which:

Fig. 1 diagrammatically represents an embodiment of my invention, and

Fig. 2 represents the type of record provided by the embodiment of Fig. 1 showing the rotation rate of drilling;

Fig. 3 represents the type of record showing the time rate of drilling, and

Figure 4:
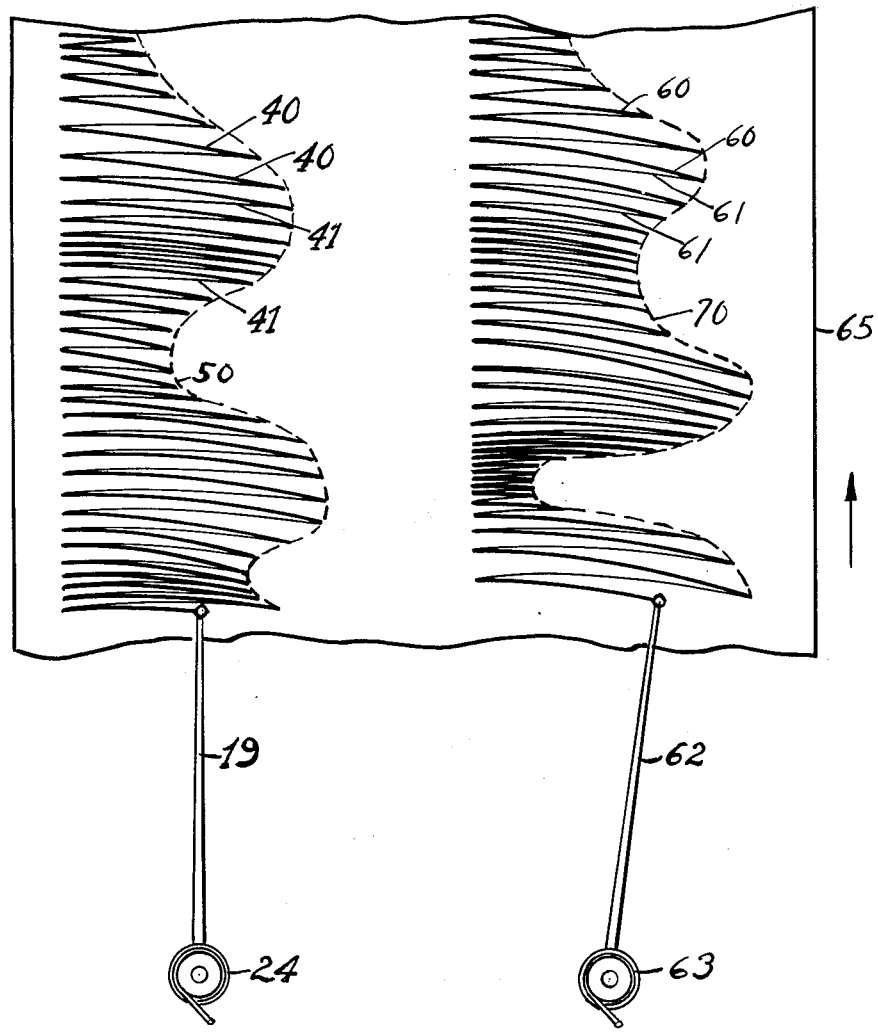
Fig. 4 shows the combined rotation and time rate of drilling records which may be obtained.

Referring now to Fig. 1, the equipment conventionally used in drilling an oil well is shown. A derrick 1 is provided from which is mounted, by suitable tackle, the drilling equipment. A crown block 2 is provided at the top of the derrick from which is suspended a travelling block 3. A cable 4, passing through the travelling block and crown block, is wound upon a power drum 5 suitably driven to support the weight of the drilling equipment. Suspended from the travelling block is a swivel 34, which in turn supports a square shaft 35, coupled to a rotary table 6. Below the rotary table a drill pipe 7 is connected, at the bottom of which is a drill 8. The rotary table is rotated by means not shown, such as a powerful motor, causing the drill pipe and drill to rotate and cut into the earth.

In accordance with my invention I add to this conventional equipment a light wire line 10 attached to the travelling block 3. This line passes over a pulley 9 supported on the crown block. The line 10 then passes over measuring wheels 11 and 12 and thence to drum 13, rotated by suitable means, for example, by means of the weight illustrated, to maintain a constant tension on the line 10. The measuring wheels 11 and 12 may be simple pulleys over which the line 10 is encircled at least once to secure positive drive of the measuring wheels. It is apparent, therefore, that the wheels 11 and 12 will be caused to rotate at a rate proportional to the downward travel of the travelling block 3 and the drill 8. A pulley 14 attached to the measuring wheel 11 supports a belt 15 which turns the drum 16 of the recording paper 17. By this means, therefore, the recording paper is caused to move at a rate proportional to the downward travel of the drill 8. The measuring wheel 12 is fixed to a shaft 18 which causes a pen 19 to move across the recording paper as the wheel 12 is rotated. The shaft 18 comprises two sections which are coupled by a clutch 20. The clutch is maintained in normal engagement, to permit rotation of pen 19, by means of a spring 21 compressed between the clutch and bearing 22 supported by fixed support 23. Rotation of the measuring wheel 12 causes the pen to move across the paper against the tension of spring 24 which is connected to the end of the shaft 18 supporting the pen 19 and is also connected to a fixed support 25. The spring 24 causes the pen to return to a null position when the clutch 20 is disengaged by means to be described. Disengagement of the clutch occurs after a predetermined number of revolutions of the drill by means of geared wheel 26 having a projecting lug 27 positioned to strike a projection 28 on the shaft 18, causing the clutch to be momentarily disengaged. The geared wheel 26 is rotated by a series of gears 29 and 30 driven by a circular rack 31 mounted on the circumference of the rotary table 6. The wheel 26 is so geared, that the lug 27 will be caused to strike the projection 28 once for a predetermined number of revolutions of the rotary table.

By means of the apparatus heretofore described, a record will be produced of a nature as shown in Fig. 2. The length of each line 40 will represent the downward progression of the drill for the predetermined number of revolutions. When the drill is passing through a comparatively soft substratum, a comparatively long line will be produced. When the drill is passing through a hard substratum a comparatively short line will be produced by the pen. By examination of the records so produced continuously during the drilling operation, it is thus possible to obtain valuable information as to the hardness and characteristics of the substrata through which the drill progresses. The envelope 50 of the lines produced on the record will indicate directly the rotation drilling rate. In order that the record be continuous, the belt drive 15 turning the record paper is disengaged each time the travelling block is raised to permit the addition of an added section of drilling pipe.

To obtain a log of the time rate of drilling with reference to depth in the well, the apparatus described heretofore and illustrated in Fig. 1 is modified as follows. The shaft connecting gears 29 and 30 is replaced by a shaft connected to gear 29 which is driven at a constant rate of speed. The device furnishing the constant speed rotation may be a clock or a constant speed electric motor, for example. The operation of this modification of the apparatus shown in Fig. 1 will be exactly as described before with the exception that disengagement of the clutch will occur at predetermined constant time intervals.

By means of the apparatus described in the paragraph above, a record will be produced of the nature shown in Fig. 3. The length of each outwardly drawn line 60 is proportional to the time rate of drilling and the envelope 70 of the lines produced on the record represents the time rate of drilling plotted against the depth in the well. This log is valuable not only in studying the nature of the material penetrated by the drill, but also in studying drilling problems.

A preferred use of the invention is the combination of the time rate log with the rotation rate log. Since for recording either of these logs in accordance with this invention, the paper moves at a speed proportional to the rate of drill penetration, it is clear to one skilled in the art that the two logs may be recorded simultaneously on a single recording paper. The logs thus obtained are illustrated in Fig. 4. The importance of recording both logs simultaneously lies in the fact that in this manner another quantity not obtainable from either record alone may be readily computed. This quantity is the time rate of rotation of the drill. It is obtained by dividing the time rate of drilling from the log for a given depth by the rotation drilling rate for the same depth. Since:

(1) $$\text{Time rate of drilling} = \frac{\Delta d}{\Delta t}$$

(2) $$\text{Rotation rate of drilling} = \frac{\Delta d}{\Delta n}$$

We have $$\frac{\Delta d}{\Delta t} \div \frac{\Delta d}{\Delta n} = \frac{\Delta n}{\Delta t} = \text{time rate of rotation}$$

Thus it is possible to record in a simple manner two drilling rates (rotation and time) and from the recorded data to obtain also the rotary speed. All these quantities are important from both the geologic and engineering points of view.

The apparatus described comprises simple mechanical means for plotting the penetration of a drill for each revolution of the drill and/or the penetration of a drill per unit time, during conventional oil drilling operations. It is apparent that the mechanical details of this apparatus may be greatly varied. It is, therefore, to be understood that the appended claims are to be given a broad interpretation commensurate with the scope of my invention in the light of the prior art.

Having now fully described my invention, I claim:

1. Apparatus for continuously logging the rate of penetration of a drill in oil drilling operations utilizing a derrick supporting a crown block, a travelling block, and a rotary table, comprising a record paper, driving means for said record paper, a recording pen adapted to contact said record paper, a shaft supporting said pen and adapted on rotation to move said pen across said paper, a second shaft, clutch means disengageably joining said first and second shafts, means adapted to rotate said second shaft, spring means normally urging said pen in one direction, a pulley attached to said crown block, wire line tension means, a wire line attached at one end to said travelling block, passing over said pulley, attached at its other end to said wire line tension means, and adapted to actuate said paper driving means and said rotating means for said second shaft in proportion to linear motion of said wire line, clutch disengaging means for said clutch means, and means adapted to actuate said clutch disengaging means periodically in relation to a predetermined number of rotations of said rotary table.

2. Apparatus according to claim 1 including a second pulley adapted to drive said paper driving means and a third pulley adapted to rotate said second shaft, said wire line passing over said second and third pulleys.

3. Apparatus according to claim 1 in which said first and second shafts are in axial alignment, coupled by said clutch means, and in which said apparatus includes a second spring means normally keeping said clutch means in an engaged position, a projecting collar affixed to said second shaft, a wheel provided with a projecting lug adapted to engage said projecting collar during some portion of the rotation of said wheel and thereby disengage said clutch means, and means adapted to rotate said wheel in proportion of rotation of said rotary table.

EUGENE M. McNATT.

REFERENCES CITED

The following references are of record in the file of this patent:

UNITED STATES PATENTS

| Number | Name | Date |
|---|---|---|
| 2,287,819 | Nichols | June 30, 1942 |
| 2,330,752 | Sikes, Jr. | Sept. 28, 1943 |
| 2,330,753 | Sikes, Jr. | Sept. 28, 1943 |
| 2,365,014 | Silverman et al. | Dec. 12, 1944 |